United States Patent
Bronfer et al.

(10) Patent No.: US 6,809,556 B1
(45) Date of Patent: Oct. 26, 2004

(54) SELF-COMPENSATING GLITCH FREE CLOCK SWITCH

(75) Inventors: Alexander Bronfer, Ramat Gan (IL); Svetlana Slotzkin, Yahud (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/655,712

(22) Filed: Sep. 4, 2003

(51) Int. Cl.[7] .......................... H03K 17/00; H03K 3/00; G06F 1/04
(52) U.S. Cl. ......................................... 327/99; 327/298
(58) Field of Search .......................... 327/99, 291, 298, 327/407; 713/500, 502

(56) References Cited

U.S. PATENT DOCUMENTS 6,466,075 B2 * 10/2002 Douchi et al. .............. 327/296
6,593,780 B2 * 7/2003 Lammers .................... 327/99
6,600,355 B1 * 7/2003 Nguyen ...................... 327/298

\* cited by examiner

*Primary Examiner*—Tuan T. Lam
(74) *Attorney, Agent, or Firm*—Ronald O. Neerings; Wade James Brady, III; Frederick J. Telecky, Jr.

(57) ABSTRACT

A glitch free self-correcting clock switching mechanism operative to switch between two clocks in a glitch free manner while compensating for the ambiguity inherent in the switching operation. During the switching from fast to slow clock domains the mechanism measures the uncertainty or ambiguity of the first slow clock cycle duration during the switching operation and stores this value. At some time later, during the slow to fast clock switching the clock switch mechanism compensates for the metastability of the first slow clock cycle during fast to slow switching using the ambiguity value previously measured. In this manner the fast and slow clocks are switched between each other in a glitch-free and self compensating manner.

18 Claims, 5 Drawing Sheets

SELF-COMPENSATING GLITCH FREE CLOCK SWITCH

FIELD OF THE INVENTION

The present invention relates to the field of data communications and more particularly relates to a self-compensating glitch free clock switch mechanism.

BACKGROUND OF THE INVENTION

Many communication systems today, such as the Bluetooth standard, are implemented in a master/slave arrangement whereby several slave communication devices communicate with a master communication device. These systems are often designed as isochronous or synchronous communication systems. A problem often encountered by such systems is how to synchronize the master/slave communications channel. In a Time Division Multiples Access (TDMA) system, slave devices are configured to 'sleep' during the time they are not actively communicating with the master (or base) communication device. Low power consumption, an increasingly important goal, is achieved by employing two clocks. A fast clock is used during data transmission with the master and a slow clock is used for the remainder of the time. Thus, the problem of synchronization between master and slave devices is particularly challenging due to the use of a multi-clock scheme.

Counters are typically used to track the time when a slave device is to awaken for transmission. After transmission is complete (i.e. active cycle finishes) the slave device goes to sleep and the clock switches from fast to slow in order to minimize power consumption. Interrupts are configured to wake the slave up at the next transmission time. When transitioning from fast clock to slow clock, however, synchronization between the master and slave devices is lost due to the ambiguity created during the switching event.

The ambiguity problem arises during the switching from fast to slow domains wherein the first cycle of the slow clock is ambiguous and unpredicted. The actual amount of ambiguity depends only on the phase relation between the fast and slow clocks. The metastability of the first cycle of the slow clock after switching can therefore be a maximum of up to one period of the slow clock and results in unpredicted timing drift over time. Since both fast and slow clocks are separate free running clocks, the switching from one to the other occurs at arbitrary instances in time. Worst case is that the slow clock is off an entire slow clock period. The maximum ambiguity of a slow to fast clock transition is the period of a fast clock cycle.

For example, consider a fast clock of 1 MHz and a slow clock of 32 kHz. One cycle of the slow clock is therefore approximately 30 microseconds. The maximum ambiguity is this system is therefore 30 microseconds that may or may not be tolerable depending on the required accuracy. In a system that requires +/−10 microseconds accuracy, 30 microseconds ambiguity is non acceptable.

Using a multiplexer alone to switch the clock is not sufficient because of the restriction on the width of the glitch. The glitch may be sufficient to lock up any flip-flops in the circuit.

Figure 1:
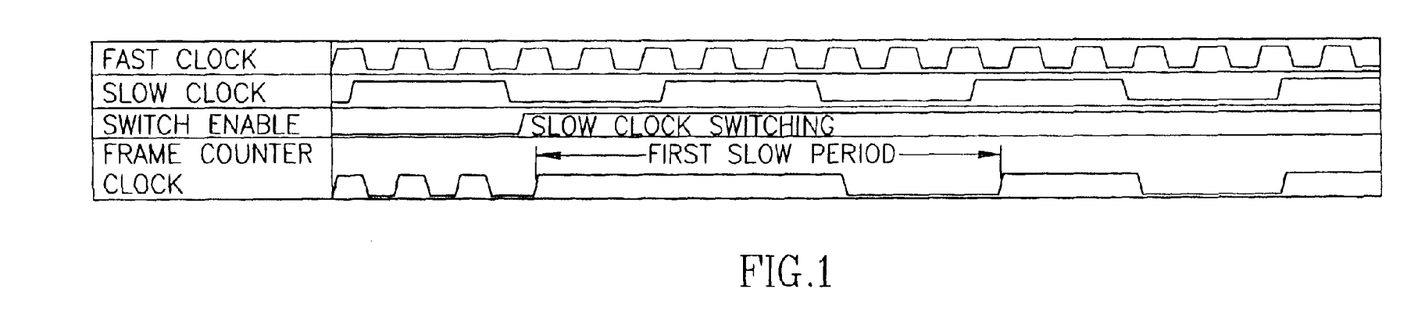
FIG. 1 is an example timing diagram illustrating the uncertainty of the first slow clock cycle during fast to slow clock switching.

An example timing diagram illustrating the uncertainty of the first slow clock cycle during fast to slow clock switching is shown in FIG. 1. The signals shown in the example timing diagram include the fast clock, slow clock, switch enable signal and the frame counter clock which is used to determine when the slave device is to wake up and go to sleep. As indicated, the first slow clock cycle can be off by up to an entire slow clock period.

Figure 2:
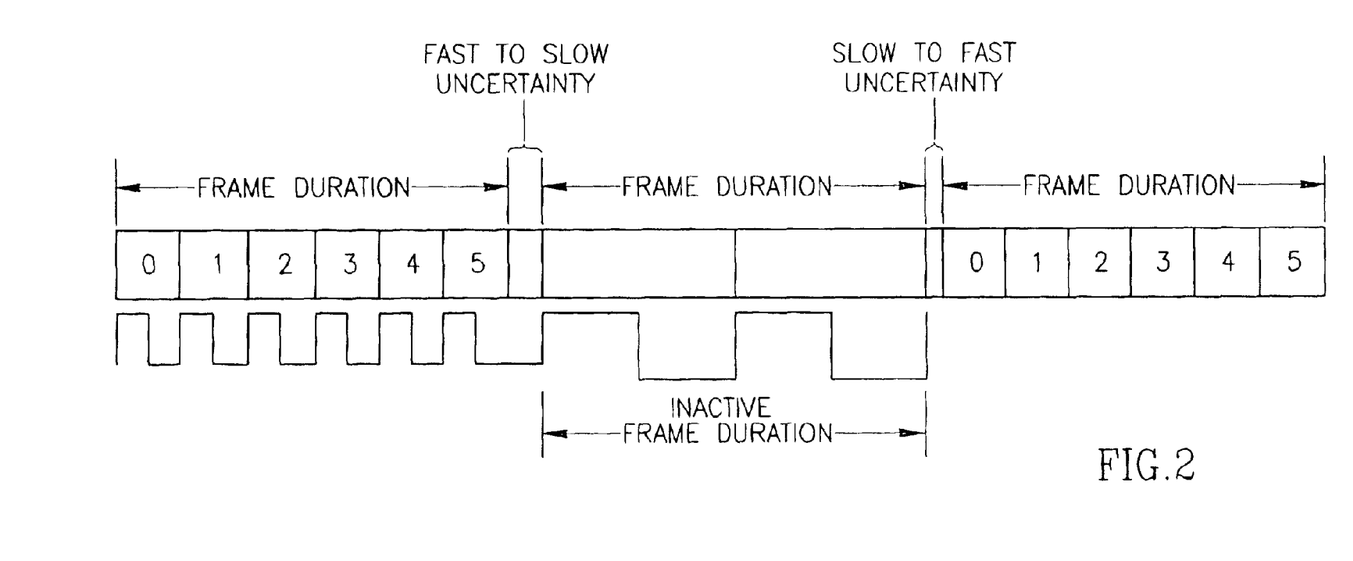
FIG. 2 is a diagram illustrating the resultant frame counter drift due to fast to slow and slow to fast clock switching.

A diagram illustrating the resultant frame counter drift due to fast to slow and slow to fast clock switching is shown in FIG. 2. The uncertainty generated during fast to slow and slow to fast clock switching is caused by the slave losing synchronization achieved during the previous synchronization event. The loss in synchronization is caused by the unpredictable phase shift between the fast and slow clock during clock switching of the frame counter.

There is therefore a need for a clock switching mechanism that is capable of providing glitch free switching between two clocks. In addition, the mechanism should be self-correcting whereby the ambiguity created during the first slow clock period is compensated for.

SUMMARY OF THE INVENTION

The present invention is a glitch free self-correcting clock switching mechanism operative to switch between two clocks in a glitch free manner while compensating for the ambiguity inherent in the switching operation itself. The mechanism of the present invention is especially suited for use in communication systems that employ a master/slave configuration. In particular, the invention is suited for use in slave communication devices to perform the clock switching that occurs in transitioning between active and sleep modes of operation.

During the switching from fast to slow clock domains the mechanism of the present invention measures the uncertainty or ambiguity of the first slow clock cycle duration during the switching operation and stores this value. During the slow to fast clock switching the clock switch mechanism compensates for the metastability of the first slow clock cycle during fast to slow switching using the ambiguity value previously measured. In this manner the fast and slow clocks are switched from one to the other in a glitch-free and self compensating manner. Note that the resolution of compensation of the clock switch is up to one fast clock cycle. In addition, the slow to fast switching request command must be received one full cycle before the actual desired point of switching.

One advantage of the clock switch of the present invention is that the timing drift caused by switching between fast and slow clock domains is compensated for within the switch itself The mechanism can be applied for use in many types of systems and is a general solution that frees system resources that would otherwise be consumed in handling the drift compensation caused by fast to slow clock switching. It is noted that the system resources used must be of a real-time nature since the drift compensation task itself occurs in real-time.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of switching between a first clock and a second clock, the second clock having a slower rate than that of the first clock, the method comprising the steps of receiving a first switch command signal to switch from the first clock to the second clock, generating a first mask signal so as to mask the first clock until a next positive transition of the second clock, measuring a first time duration the first mask signal was active to determine the ambiguity of a first cycle of the second clock, outputting the second clock as an output clock, receiving a second switch command signal to switch from the second clock to the first clock, generating a second mask signal having a second time duration of one second clock period less the first time duration to mask the second clock so as to compensate for the ambiguity of the first cycle of the second clock and outputting the first clock as the output clock.

There is also provided in accordance with the invention, a method of switching between a fast clock and a slow clock, the fast clock having a higher clock rate than that of the slow clock, the method comprising the steps of providing a counter loaded initially with a value corresponding to a period of the slow clock, receiving a first command to switch from the fast clock to the slow clock, in response to the first command, generating a first mask signal until a first low to high transition of the slow clock for masking the fast clock, enabling count down of the counter while the mask signal is active and freezing the counter thereafter, switching from the fast clock to the slow clock, receiving a second command to switch from the slow clock to the fast clock, in response to the second command, enabling the countdown of the counter to zero, generating a second mask signal until the counter reaches zero and switching from the slow clock to the fast clock.

There is further provided in accordance with the invention, a method of switching between a fast clock and a slow clock, the fast clock having a higher clock rate than that of the slow clock, the method comprising the steps of receiving a first command to switch from the fast clock to the slow clock, switching from the fast clock to the slow clock, measuring the ambiguity of a first slow clock cycle, receiving a second command to switch from the slow clock to the fast clock, compensating the last cycle of the slow clock by an amount corresponding to the previously measured ambiguity and switching from the slow clock to the fast clock.

There is also provided in accordance with the invention, a clock switching apparatus comprising a multiplexer for switching between a slow clock and a fast clock input thereto, a gate for gating the output of the multiplexer with a mask signal, the gate adapted to produce an output clock signal, a counter adapted to count down a period of the slow clock, a timing and control circuit adapted to receive a first command to switch from the fast clock to the slow clock, in response to the first command, first activate the mask signal until a first low to high transition of the slow clock, enable countdown of the counter while the mask signal is active and freezing the counter thereafter, configure the multiplexer to output the slow clock, receive a second command to switch from the slow clock to the fast clock, in response to the second command, enable the countdown of the counter to zero, second activate the mask signal until the counter reaches zero and configure the multiplexer to output the fast clock.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| FPGA | Field Programmable Gate Array |
| TDMA | Time Division Multiple Access |

Detailed Description of the Invention

The present invention is a glitch free self-correcting clock switching mechanism operative to switch between two clocks in a glitch free manner while compensating for the ambiguity inherent in the switching operation itself. The mechanism of the present invention is especially suited for use in communication systems that employ a master/slave configuration. In particular, the invention is suited for use in slave communication devices to perform the clock switching that occurs in transitioning between active and sleep modes of operation.

It is noted that the present invention is not limited to use with any particular modulation or communication system. Throughout this document the invention is described in reference to a Bluetooth communication system. Note that the invention is not limited to this communications system, as one skilled in the relevant electrical arts can apply the clock switching mechanism of the present invention to other communication systems without departing from the spirit and scope of the present invention. Depending on the particular application and implementation, the invention is applicable for use with a multitude of communication systems, modulations and protocols. In general, the clock switching mechanism of the present invention is applicable wherever it is advantageous to switch between fast and slow clocks in a glitch free manner while providing self-compensation for switching ambiguity. Such a need may be encountered not only in wireless communication systems, such as those based on the Bluetooth standard, but also in non-wireless or non communication systems.

Figure 3:
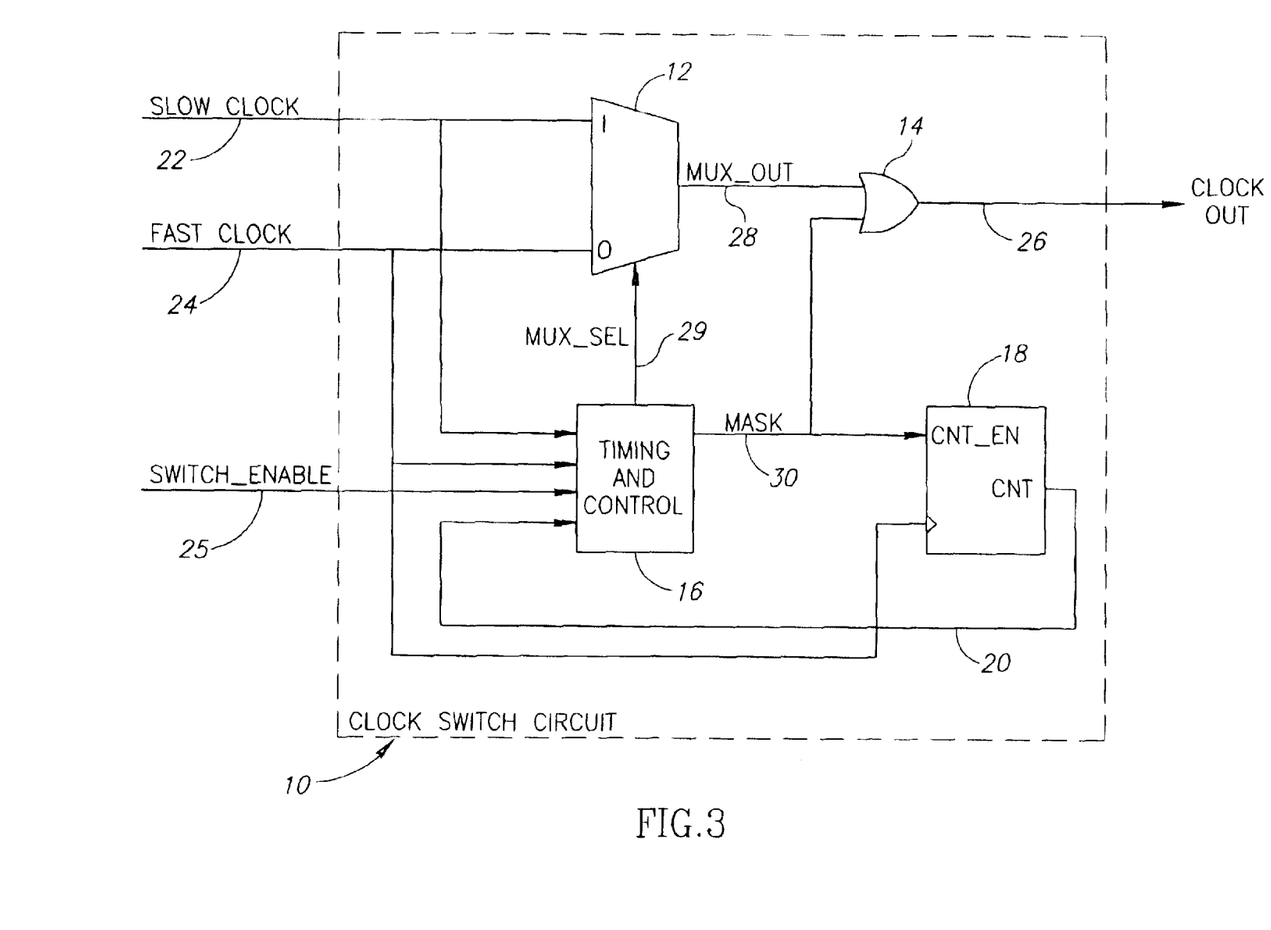
FIG. 3 is a block diagram illustrating an example clock switch circuit constructed in accordance with an embodiment of the present invention.

A block diagram illustrating an example clock switch circuit constructed in accordance with an embodiment of the present invention is shown in FIG. 3. The clock switch circuit, generally referenced 10, comprises a multiplexer 12, OR gate 14, timing and control circuit 16 and a counter (CNT) 18. The multiplexer is adapted to receive two clock signals: a slow clock 22 and a fast clock 24. The output of the multiplexer 28 (MUX_OUT) is input to the gate 14. The output 26 of the gate forms the CLOCK OUT signal of the circuit.

The timing and control circuit receives the slow clock, fast clock, switch enable 25 and the output 20 of the counter as inputs and is operative to generate the multiplexer select (MUX_SEL) signal 29 and mask (MASK) signal 30 in response therefrom. The mask signal forms the second input of the gate 14 and the count enable (CNT_EN) signal for the counter.

In accordance with the present invention, the ambiguity created during fast to slow clock switching is compensated for by the clock switching circuit. In addition, fast to slow and slow to fast clock switching is performed without generating any glitches.

The timing and control circuit, which in an example embodiment is implemented as a state machine, is operative to generate the multiplexer select and mask signals. The clock signal output of the multiplexer is gated with the MASK signal in order to mask the slow clock until the first low to high transition. It is appreciated that one skilled in the art can modify the present invention to generate the mask signal until a high to low transition of the slow clock as well.

Figure 6:
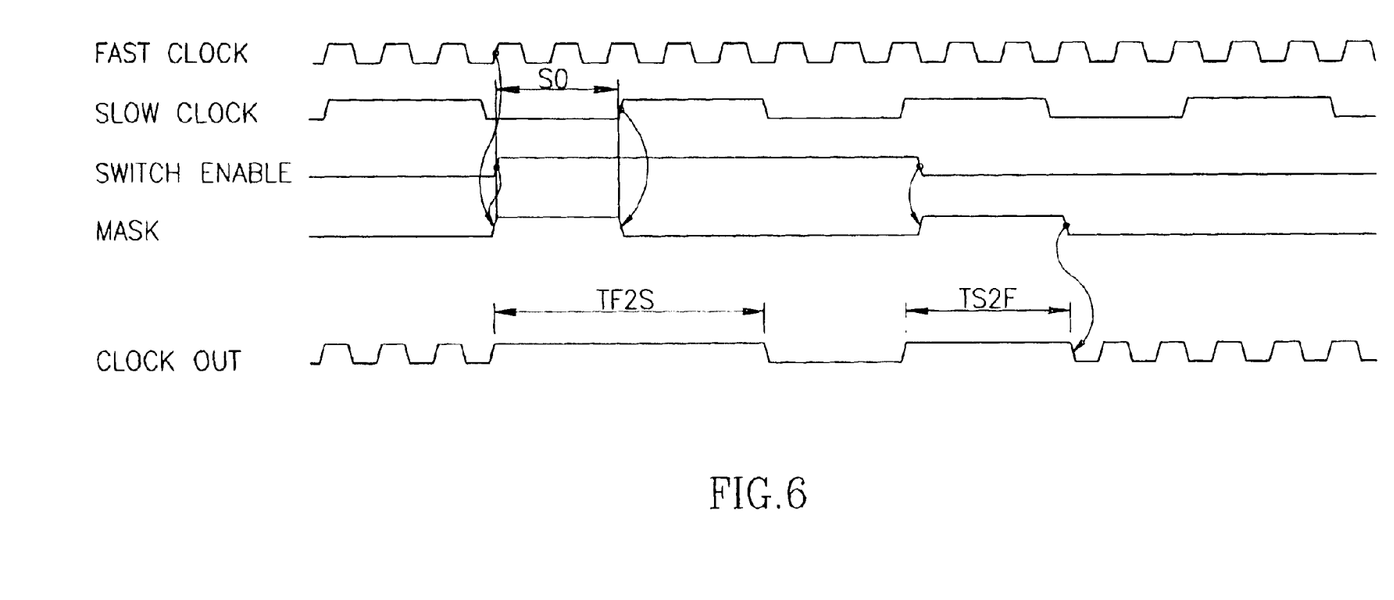
FIG. 6 is an example timing diagram illustrating the timing relationship of the relevant signals during operation of the clock switch circuit of the present invention.

With reference to the timing diagram illustrated in FIG. 6, in operation, the switch enable signal goes high when the slave device is to enter the sleep mode. This triggers the mask signal to go high in response thereto. Note that the timing and control circuit is clocked by the fast clock. The mask signal is brought high at the next low to high transition of the fast clock. Because the output of the multiplexer is gated with the mask signal, the output of the gate is forced high while the mask signal is high.

The mask signal also enables the counter which is configured to count down from a preloaded value to zero. The counter is initialized with a value corresponding to one complete cycle of the slow clock. While the mask is active high, the counter counts down from its initial value. The mask signal is brought low upon the first low to high transition of the slow clock. At this point, the count enable is removed and the counter value is frozen.

The value of the counter represents the ambiguity of the first slow clock cycle (SO). This value will be compensated for when during switching from slow to fast clock. Thus, the clock switch circuit is operative to make the last slow clock period just before slow to fast switching equal to $T_{SLOWCLOCK}$-SO. Thus, the ambiguity on the first slow clock cycle is compensated for during the slow to fast clock switching. The switch enable signal, however, must transition one slow clock cycle before the desired switching instance in time.

The switch enable signal goes low to indicate that the slave device is to wake up again. This triggers the mask signal going high and enables the counter once again. The timing and control circuit maintains the mask signal and waits for the counter to reach zero. While the mask signal is high, the MUX_OUT signal is masked and the CLOCK OUT is fixed high. When the counter reaches zero, the mask is brought low and the MUX_SEL is set to pass the fast clock to the CLOCK OUT.

Figure 4:
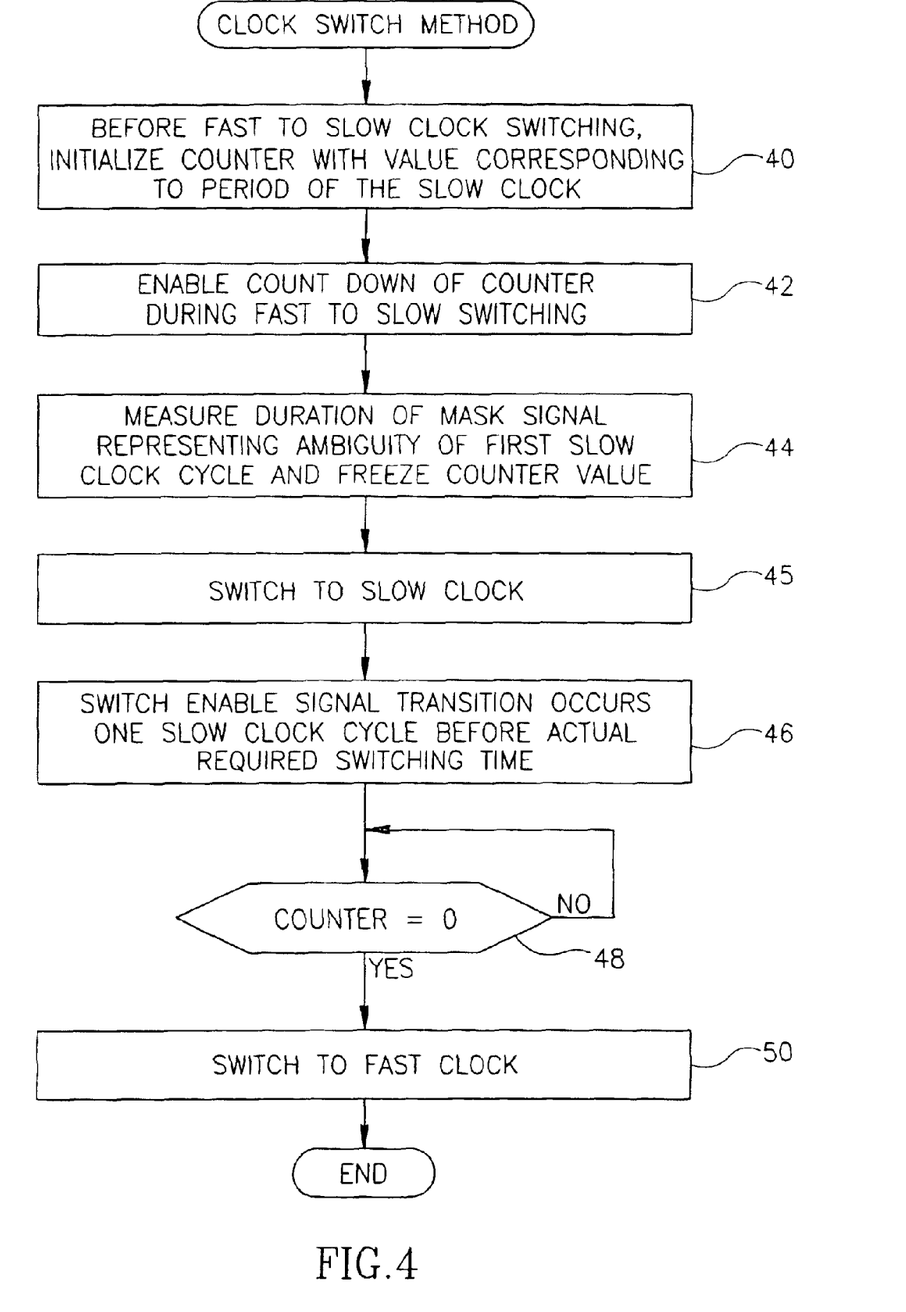
FIG. 4 is a flow diagram illustrating the clock switching method of the present invention.

A flow diagram illustrating the clock switching method of the present invention is shown in FIG. 4. Before fast to slow clock switching, the counter is initialized with a value corresponding to one period of the slow clock (step 40). During fast to slow switching, the counter is enabled to countdown from its initial value towards zero (step 42). The duration of the mask signal representing the ambiguity of the first slow clock cycle is measured and the counter value is frozen (step 44). Fast to slow clock switching occurs and the slow clock is output (step 45).

The transition of the switch enable signal is configured to occur one slow clock cycle before the actual required switching instance (step 46). It is during this slow clock cycle that the ambiguity created in the previous fast to slow switching is compensated for. The circuit then waits for the counter to reach zero (step 48). Once the counter reaches zero, switching from slow to fast clocks occurs (step 50). At this point in time, the ambiguity of the fast to slow switching has been compensated for.

Figure 5:
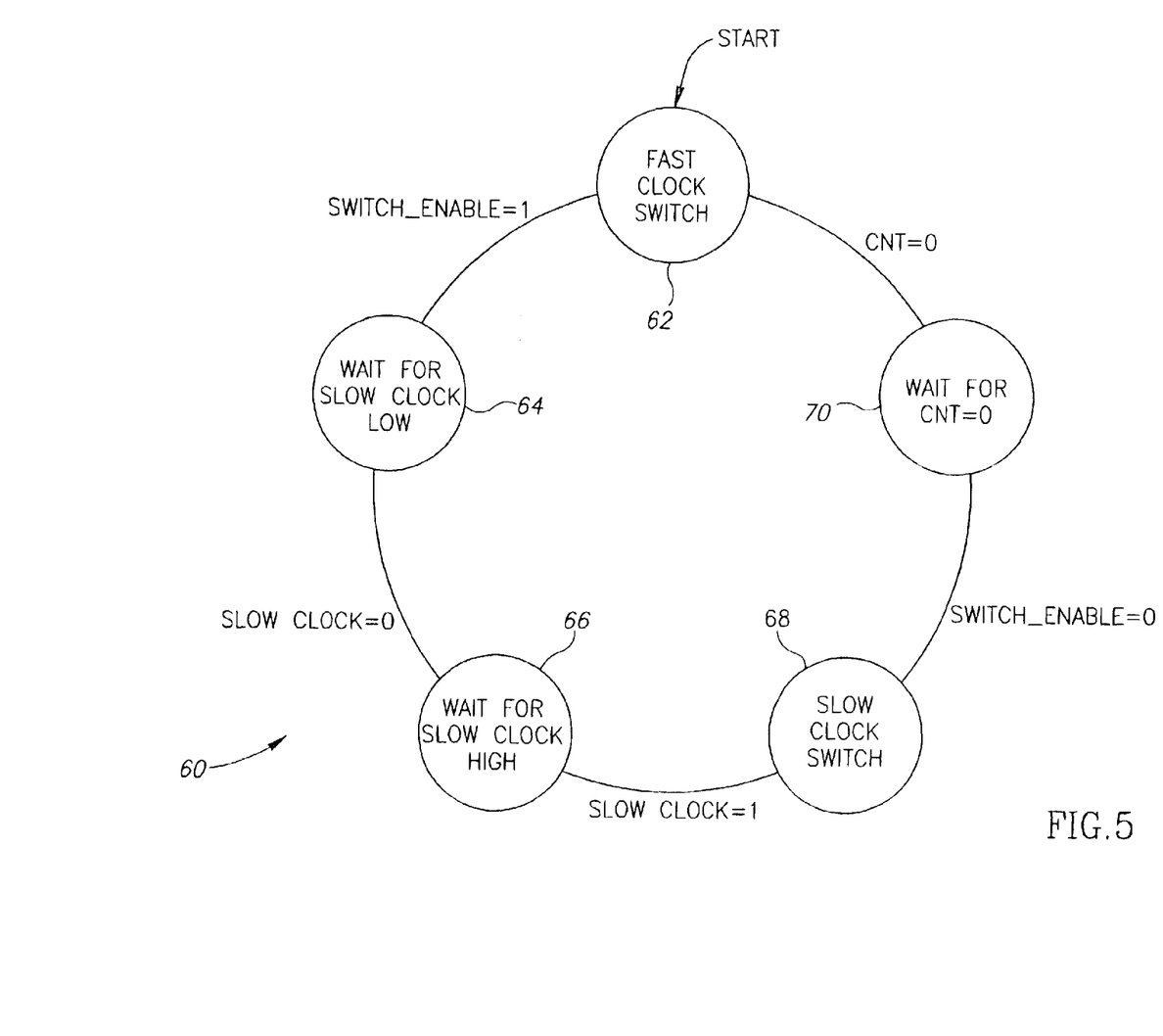
FIG. 5 is a state transition diagram of the state machine implemented in the timing and control portion of the clock switch circuit of FIG. 3.

A state transition diagram of the state machine implemented in the timing and control portion of the clock switch circuit of FIG. 3 is shown in FIG. 5. The state transition diagram, generally referenced 60, is implemented by the timing and control circuit 16 (FIG. 3). Upon power-up or reset, the machine enters the Fast Clock Switch state 62. In this state the MASK, MUX_SEL and CNT_EN signals are all set to '0'. Upon the switch enable going high (i.e. receiving the command to enter sleep mode), the machine moves to the Wait For Slow Clock Low state 64. In this state the MASK signal is set to '1', the MUX_SEL signal is set to '0' and the CNT_EN signal is set to '1'. As soon as the switch enable signal is set to one, the state machine forces the MASK signal high where it remains at this level until the rising edge of the slow clock is detected. Once this occurs, it is safe to remove the MASK signal and generate glitch free clock switching.

The mask signal being set will remove any possible glitches from the switching to the slow clock. The multiplexer remains configured to continue passing the fast clock which is now masked by the MASK signal at the gate which is in this example embodiment is implemented as an OR gate. It is appreciated that one skilled in the electrical arts can utilize other gate types without departing from the scope of the invention.

The machine then waits for the slow clock to go low. Once the slow clock goes low, the machine moves to the Wait For Slow Clock High state 66. In this state the MASK signal is set to '1', the MUX_SEL signal is remains set to '0' and the CNT_EN signal remains set to '1'. In order to prevent glitches during switching, the circuit waits for a low to high transition before removing the mask signal from the gate.

Once the slow clock goes high, the machine enters the Slow Clock Switch state 68. In this state the MASK signal is set to '0', the MUX_SEL signal is set to '1' and the CNT_EN signal is set to '0'. Thus, the slow clock going high causes the MASK signal to go low and the count value is frozen. In addition, the multiplexer is configured to output the slow clock which passes through the gate to the CLOCK OUT.

At some point in time, the command to wake up the slave device is received. The switch enable signal goes low to indicate that the clock output is to be switched to the fast clock. When switch enable is set to a low level, the state machine waits until the counter reaches zero. At that point, the state machine switches the fast clock. Note that the overall compensation error during fast to slow and slow to fast switching is two fast clock periods (one during fast to slow and one during slow to fast).

The switch enable going low triggers the machine to enter the Wait For CNT=0 state 70. In this state the MASK signal is set to '1', the MUX_SEL signal remains set to '1' and the CNT_EN signal is set to '1'. In this state, the ambiguity previously measured by the counter is compensated for by permitting the counter to count down to zero before switching to the fast clock. Thus, the CLOCK OUT is held high by the MASK signal during this time and the multiplexer remains configured to output the slow clock.

When the counter reaches zero, the machine enters the Fast Clock Switch state 62. In this state the MASK, MUX_SEL and CNT_EN signals are all set to '0'. Thus, mask signal is removed while the multiplexer is configured to output the fast clock which passes through the gate to CLOCK OUT. The counter is disabled and the sequence described hereinabove repeats upon switch enable going high.

Regarding the counter, assume a fast clock of 1 MHz and a slow clock of 20 kHz. In this case, there are 50 fast clock cycles for every slow clock cycle. As described in detail above, the maximum deviation of the first slow clock period after fast to slow switching is at most one period of the slow clock Therefore, the counter must be able to count down a minimum value of 50. A 6-bit counter is therefore sufficient to measure the first slow clock cycle ambiguity in this example.

Assuming the switch enable goes low one slow clock cycle before the actual switch time required when the switch to the fast clock is required, the counter is preloaded with the value 49 before fast to slow switching occurs. During fast to slow switching the counter counts down and measures the duration of the MASK signal (i.e. the slow clock uncertainty) and freezes the count when the positive edge of the slow clock is detected. When the time to switch to the fast clock arrives, the MASK SIGNAL forces a high CLOCK OUT and the state machine waits for the counter to count down to zero, thus compensating for the previously measured ambiguity. The switch to the fast clock is made and at this point the fast to slow ambiguity is compensated for.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of switching between a first clock and a second clock, said second clock having a slower rate than that of said first clock, said method comprising the steps of:

receiving a first switch command signal to switch from said first clock to said second clock;

generating a first mask signal so as to mask said first clock until a next positive transition of said second clock;

measuring a first time duration said first mask signal was active to determine the ambiguity of a first cycle of said second clock;

outputting said second clock as an output clock;

receiving a second switch command signal to switch from said second clock to said first clock;

generating a second mask signal having a second time duration of one second clock period less said first time duration to mask said second clock so as to compensate for said ambiguity of said first cycle of said second clock; and outputting said first clock as said output clock.

2. The method according to claim 1, wherein said output clock is utilized as a Bluetooth clock signal.

3. The method according to claim 1, wherein said second command signal is received one cycle of said second clock before a desired clock switch time.

4. The method according to claim 1, wherein said first mask signal functions to generate glitch free switching between said first clock and said second clock and to indicate the ambiguity of said first cycle of said second clock.

5. A method of switching between a fast clock and a slow clock, said fast clock having a higher clock rate than that of said slow clock, said method comprising the steps of:

providing a counter loaded initially with a value corresponding to a period of said slow clock;

receiving a first command to switch from said fast clock to said slow clock;

in response to said first command, generating a first mask signal until a first low to high transition of said slow clock for masking said fast clock;

enabling count down of said counter while said mask signal is active and freezing said counter thereafter;

switching from said fast clock to said slow clock;

receiving a second command to switch from said slow clock to said fast clock;

in response to said second command, enabling the countdown of said counter to zero;

generating a second mask signal until said counter reaches zero; and switching from said slow clock to said fast clock.

6. The method according to claim 5, wherein said output clock is utilized as a Bluetooth clock signal.

7. The method according to claim 5, wherein said second command signal is received one cycle of said second clock before a desired clock switch time.

8. The method according to claim 5, wherein said first mask signal functions to generate glitch free switching between said fast clock and said slow clock and to indicate the ambiguity of said first cycle of said slow clock.

9. A method of switching between a fast clock and a slow clock, said fast clock having a higher clock rate than that of said slow clock, said method comprising the steps of:

receiving a first command to switch from said fast clock to said slow clock;

switching from said fast clock to said slow clock;

measuring the ambiguity of a first slow clock cycle;

receiving a second command to switch from said slow clock to said fast clock;

compensating the last cycle of said slow clock by an amount corresponding to said previously measured ambiguity; and switching from said slow clock to said fast clock.

10. The method according to claim 9, wherein said output clock is utilized as a Bluetooth clock signal.

11. The method according to claim 9, wherein said second command signal is received one cycle of said second clock before a desired clock switch time.

12. A clock switching apparatus, comprising:

a multiplexer for switching between a slow clock and a fast clock input thereto;

a gate for gating the output of said multiplexer with a mask signal, said gate adapted to produce an output clock signal;

a counter adapted to count down a period of said slow clock;

a timing and control circuit adapted to:
receive a first command to switch from said fast clock to said slow clock;
in response to said first command, first activate said mask signal until a first low to high transition of said slow clock;
enable countdown of said counter while said mask signal is active and freezing said counter thereafter;
configure said multiplexer to output said slow clock;
receive a second command to switch from said slow clock to said fast clock;
in response to said second command, enable the countdown of said counter to zero;
second activate said mask signal until said counter reaches zero; and
configure said multiplexer to output said fast clock.

13. The apparatus according to claim 12, wherein said output clock signal is utilized as a Bluetooth clock signal.

14. The apparatus according to claim 12, wherein said timing and control circuit is implemented as a state machine.

15. The apparatus according to claim 12, wherein said counter is loaded with a value corresponding to the period of said slow clock before said first activation of said mask signal.

16. The apparatus according to claim 12, wherein said second command is received one cycle of said slow clock before a desired clock switch time.

17. The apparatus according to claim 12, wherein said mask signal functions both to generate glitch free switching between said fast clock and said slow clock and to indicate the ambiguity of said first cycle of said slow clock.

18. The apparatus according to claim 12, wherein said gate comprises an OR gate.

\* \* \* \* \*